(12) United States Patent
Zhang

(10) Patent No.: US 12,101,810 B2
(45) Date of Patent: Sep. 24, 2024

(54) METHOD AND DEVICE IN A NODE USED FOR WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 475 days.

(21) Appl. No.: 17/377,404

(22) Filed: Jul. 16, 2021

(65) Prior Publication Data
US 2021/0352725 A1 Nov. 11, 2021

Related U.S. Application Data

(63) Continuation of application No. PCT/CN2021/075017, filed on Feb. 3, 2021.

(30) Foreign Application Priority Data

Feb. 4, 2020 (CN) .......................... 202010079865.7

(51) Int. Cl.
| | |
|---|---|
| *H04W 74/0816* | (2024.01) |
| *H04W 72/0446* | (2023.01) |
| *H04W 72/0453* | (2023.01) |
| *H04W 74/00* | (2009.01) |

(52) U.S. Cl.
CPC ... *H04W 74/0816* (2013.01); *H04W 72/0446* (2013.01); *H04W 72/0453* (2013.01); *H04W 74/004* (2013.01)

(58) Field of Classification Search
CPC ... H04L 1/1657; H04L 1/1896; H04L 5/0094; H04L 5/0048; H04W 24/02; H04W 16/14
USPC ........................................................ 455/449
See application file for complete search history.

(56) References Cited

U.S. PATENT DOCUMENTS

| | | | | |
|---|---|---|---|---|
| 8,176,684 B2* | 5/2012 | Marchetto | ............... | E05F 15/40 49/506 |
| 8,744,466 B2* | 6/2014 | Hirano | .................. | H04W 24/02 455/449 |

(Continued)

FOREIGN PATENT DOCUMENTS

| | | |
|---|---|---|
| CN | 110475265 A | 11/2019 |
| WO | 2018066909 A1 | 4/2018 |

(Continued)

OTHER PUBLICATIONS

A. Gorcin and H. Arslan, "Signal identification for adaptive spectrum hyperspace access in wireless communications systems," in IEEE Communications Magazine, vol. 52, No. 10, pp. 134-145, Oct. 2014, doi: 10.1109/MCOM.2014.6917415. (Year: 2014).*

(Continued)

*Primary Examiner* — William D Cumming

(57) ABSTRACT

A first node receives a first signaling; performs a first channel sensing operation over a first subband; and transmits a first signal. The first signaling comprises first indication information, used for indicating an Rx parameter of the first channel sensing operation; the first channel sensing operation is used for determining channel occupancy information, the channel occupancy information used for determining whether the first subband can be used by a transmitter of the first signaling for signal transmission; the first signal is used for indicating the channel occupancy information. The receiver in communications is enabled to perform channel sensing and feedback results, hence a reduction in interferences incurred from hidden node issues.

17 Claims, 6 Drawing Sheets

(56) References Cited

U.S. PATENT DOCUMENTS

| | | | | |
|---|---|---|---|---|
| 10,281,566 | B2* | 5/2019 | Hallek | G01S 15/876 |
| 10,284,923 | B2* | 5/2019 | Sattiraju | H04Q 9/00 |
| 2008/0252475 | A1* | 10/2008 | Jensen | F16K 37/0083 |
| | | | | 340/683 |
| 2011/0273286 | A1* | 11/2011 | Sklar | A61F 5/05891 |
| | | | | 602/17 |
| 2016/0313438 | A1* | 10/2016 | Hallek | G01S 15/876 |
| 2019/0074926 | A1* | 3/2019 | Zhang | H04L 1/0004 |
| 2019/0199483 | A1* | 6/2019 | Zhang | H04L 1/1896 |
| 2019/0268939 | A1 | 8/2019 | Yang et al. | |
| 2020/0100093 | A1* | 3/2020 | Ren | H04W 16/14 |
| 2022/0417992 | A1* | 12/2022 | Zhang | H04L 5/0094 |

FOREIGN PATENT DOCUMENTS

| | | | |
|---|---|---|---|
| WO | 2019079500 A1 | 4/2019 | |
| WO | 2019146986 A1 | 8/2019 | |
| WO | WO-2021180052 A1 * | 9/2021 | H04L 5/0048 |

OTHER PUBLICATIONS

English translation of CN101267570. Printed Oct. 20, 2023 (Year: 2023).*

Y.-C. Liang, K.-C. Chen, G. Y. Li and P. Mahonen, "Cognitive radio networking and communications: an overview," in IEEE Transactions on Vehicular Technology, vol. 60, No. 7, pp. 3386-3407, Sep. 2011, doi: 10.1109/TVT.2011.2158673. (Year: 2011).*

SR in application PCT/CN2021/075017 dated May 14, 2021.

Interdigital Inc:"On LBT for Beam-Based Transmission for NR-U", 3GPP Draft; R1-1804885 On LBT for Beam-Based Transmission for NR-U,3RD Generation Partnership Project(3GPP), Mobile Competence Centre ;650, Route Des Lucioles;F-06921 Sophia-Antipolis Cedex; FRAvol.RAN WG1, no.Sanya, China; 20180416-201804207 Apr. 2018 (Apr. 7, 2018).

CN202010079865.7 First Office Action dated Apr. 2, 2022.

CN202010079865.7 First Search Report dated Mar. 28, 2022.

TCL Communication Receiver-assisted LBT for NR-U 3GPP TSG RAN WG1 R1-1812718 Nov. 2, 2018.

* cited by examiner 11-1

11-2

11-3

METHOD AND DEVICE IN A NODE USED FOR WIRELESS COMMUNICATION

CROSS REFERENCE TO RELATED APPLICATIONS

This application is a continuation of International Application No. PCT/CN2021/075017, filed Feb. 3, 2021, claims the priority benefit of Chinese Patent Application No. 202010079865.7, filed on Feb. 4, 2020, the full disclosure of which is incorporated herein by reference.

BACKGROUND

Technical Field

The present disclosure relates to transmission methods and devices in wireless communication systems, and in particular to a transmission scheme and device in Unlicensed Spectrum in wireless communications.

Related Art

Application scenarios of future wireless communication systems are becoming increasingly diversified, and different application scenarios have different performance demands on systems. In order to meet different performance requirements of various application scenarios, the $3^{rd}$ Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 plenary to standardize the NR.

A key technology of NR is to support beam-based signal transmission, which mainly applies to scenarios where the coverage performance of an NR device working in millimeter wave band (for instance, a band larger than 6 GHz) shall be enhanced. Besides, the transmission technology is also required in lower frequency band (e.g., a band smaller than 6 GHz) to support massive MIMO. Through weighted processing on array antennas, radio frequency signals can form a stronger beam in a specific direction, while in other directions the signals are weaker. After operations such as beam measurement and beam feedback, beams from a transmitter and a receiver can be aimed at each other precisely, so that signals can be transmitted and received with stronger power, thereby enhancing the coverage performance. Cell discovery and measurement by an NR system working in millimeter wave band can be implemented through multiple SS/PBCH blocks (SSBs) or CSI-RSs. Different SSBs or CSI-RSs can employ different beams to transmit, and User Equipment (UE) at different places can detect the SSBs or CSI-RSs in the specific beam, thus completing the cell discovery or measurement.

In a traditional cellular system, data transmission only occurs on Licensed Spectrum. However, as traffic flow began to skyrocket, particularly in some urban areas, the Licensed Spectrum may hardly meet growing demands for traffic, therefore, the 3GPP Release 17 considers to extend NR applications to Unlicensed Spectrum above 52.6 GHz. To ensure compatibility with other access technologies on Unlicensed Spectrum, the technique of Listen Before Talk (LBT) is adopted so as to prevent interference caused by multiple transmitters occupying a same frequency resource at the same time. In NR technology of Unlicensed Spectrum presented in the 3GPP Release 16, a transmitter in communications (for instance, in downlink communications, the transmitter is a base station while the receiver is a UE) is allowed to perform LBT before occupying frequency resources to determine whether a channel is idle, and only when the LBT result reveals that the channel is idle can the transmitter of communications start occupying corresponding frequency resources. As for Unlicensed Spectrum above 52.6 GHz, the technique of Directional LBT is a more appropriate way to avoid interference since obvious directivity can be found in beam-based signal transmission.

A challenge against the LBT technology lies on hidden node issues. In a wireless network, if node A can be seen by a node B but cannot be seen by node C that is in communication with node B, node A can be deemed as a hidden node to node C. Consequently, when there is communication between node B and node C, node A will probably be suffering from some interference.

A challenge against the LBT technology lies in hidden node issues. In a wireless network, if a node A can be seen by a node B but cannot be seen by a node C that is in communication with the node B, the node A can be deemed as a hidden node to the node C. Consequently, when there is communication between the node B and the node C, the node A will probably be suffering from some interference.

SUMMARY

Inventors find through researches that in the scenario of Unlicensed Spectrum, where the issue of hidden node awaits to be solved, a receiver in communications can be made to perform LBT as well and then feedback the result to a transmitter. In the case of directional LBT, how the transmitter and the receiver of communications determine the LBT direction and feedback LBT result remains an unsolved problem.

To address the above problem, the present disclosure provides a solution. It should be noted that though the present disclosure only take the LBT and Unlicensed Spectrum as example in the statement above, it is also applicable to other scenarios like omnidirectional LBT and Licensed Spectrum, where similar technical effects can be achieved. Additionally, the adoption of a unified solution for various scenarios, including but not limited to directional LBT, omnidirectional LBT, Licensed Spectrum and Unlicensed Spectrum, contributes to the reduction of hardware complexity and costs. It should be noted that if no conflict is incurred, embodiments in a first node in the present disclosure and the characteristics of the embodiments are also applicable to a second node, and vice versa. What's more, the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:
  receiving a first signaling;
  performing a first channel sensing operation over a first subband; and
  transmitting a first signal;
  herein, the first signaling comprises first indication information, the first indication information being used for indicating an Rx parameter of the first channel sensing operation; the first channel sensing operation is used for determining channel occupancy information, and the channel occupancy information is used for determining whether the first subband can be used by a transmitter of the first signaling for signal transmission; the first signal is used for indicating the channel occupancy information; the first signaling is used for determining Q1 candidate resource groups, Q1 being a positive integer greater than 1; a first resource group is one of the Q1 candidate resource groups, and the first signal occupies the first resource group, the first resource group being related to the first indication information.

In one embodiment, a problem to be solved in the present disclosure includes how the first node determines Rx parameters of the first channel sensing operation and resources for feedback of the channel occupancy information.

In one embodiment, characteristics of the above method include that both the transmitter of the first signaling and the receiver of the first signal are a second node, and Rx parameters of the first channel sensing operation are indicated by the first indication information, the first signaling is associated with multiple candidate resource groups, and resources of the first node for transmitting the first signal are related to the first indication information.

In one embodiment, advantages of the above method include triggering the first node through a first signaling to perform the first channel sensing operation and indicating Rx parameters of the first channel sensing operation, thus avoiding or reducing hidden node issues in a directional LBT scenario.

In one embodiment, advantages of the above method include that the first node selects the first resource group for transmitting the first signal from the multiple candidate resource groups according to the first indication information, and the second node can determine resources utilized by the first node according to the first indication information, thus enabling the first signal to be correctly received by the second node.

According to one aspect of the present disclosure, the above method is characterized in that transmission of the first signal is used for indicating the channel occupancy information, the channel occupancy information comprising whether the first subband is idle.

In one embodiment, characteristics of the above method include that whether the first signal is transmitted represents whether the first subband is idle, and the first signal not being transmitted can represent the channel occupancy information.

In one embodiment, advantages of the above method include carrying information according to whether the first signal is transmitted, when the first signal is not transmitted, interferences to other communication nodes can be reduced, especially when the result of the channel sensing reveals that there are ongoing communications between other communication nodes.

According to one aspect of the present disclosure, the above method is characterized in that the first signaling comprises a first index, the first index being used for indicating a first device group, the first device group comprises at least one node, and the first node belongs to the first device group.

In one embodiment, a problem to be solved in the present disclosure is how to indicate multiple nodes in the performance of channel sensing.

In one embodiment, advantages of the above method include that since the first signaling is groupcast, multiple nodes can perform channel sensing together and feedback results, hence a reduction in signaling overhead.

According to one aspect of the present disclosure, the above method is characterized in receiving a second signaling, the second signaling comprising Q2 piece(s) of transmission configuration information, Q2 being a positive integer, and any one of the Q2 piece(s) of transmission configuration information is used for indicating an Rx parameter of the first channel sensing operation, and the first resource group is related to the second signaling.

According to one aspect of the present disclosure, the above method is characterized in performing a first channel sensing operation based on a target Rx parameter, the target Rx parameter belonging to a target Rx parameter set, and the target Rx parameter set comprising an overlap between the Rx parameters indicated by the first signaling and the Rx parameters indicated by the second signaling.

In one embodiment, a problem to be solved in the present disclosure is how the first node determines a possible Rx parameter set of the first channel sensing operation.

In one embodiment, characteristics of the above method include that the first node determines a possible Rx parameter of the first channel sensing operation by a second signaling in advance, and when the possible Rx parameter occurs in a first signaling, the first node will perform the first channel sensing operation based on the Rx parameter occurring in both signalings. When there is any Rx parameter in the first signaling not indicated by the second signaling, the Rx parameter shall be ignored.

In one embodiment, advantages of the above method include that if the first signaling is groupcast, the first node will determine each effective Rx parameter in the first signaling through a candidate Rx parameter pre-indicated by the second signaling, thus avoiding confusion about information contained in the first signaling.

According to one aspect of the present disclosure, the above method is characterized in that the first device group comprises multiple nodes, and the multiple nodes employ resources overlapping with the first resource group for transmitting a feedback signal.

In one embodiment, advantages of the above method include that the same resources are employed by multiple nodes for transmitting a feedback signal of the channel sensing operation, thereby conserving resources.

According to one aspect of the present disclosure, the above method is characterized in that the first signal comprises Q3 repetitions of a first sub-signal, Q3 being a positive integer greater than 1.

In one embodiment, characteristics of the above method include that the Q3 repetitions of a first sub-signal are aimed at meeting the demand of channel occupancy time and channel occupancy bandwidth of the Unlicensed Spectrum.

In one embodiment, advantages of the above method include that repetitions of the first sub-signal not only satisfy the needs of spectrum policies, but contribute to the improvement in performance.

The present disclosure provides a method in a second node for wireless communications, comprising:
    performing a second channel sensing operation over a first subband;
    transmitting a first signaling; and
    receiving a first signal;
    herein, the first signaling comprises first indication information, the first indication information being used for indicating an Rx parameter of a first channel sensing operation; the first channel sensing operation is used for determining channel occupancy information, and the channel occupancy information is used for determining whether the first subband can be used by the second node for signal transmission; the first signal is used for indicating the channel occupancy information; the first signaling is used for determining Q1 candidate resource groups, Q1 being a positive integer greater than 1; a first resource group is one of the Q1 candidate resource groups, and the first signal occupies the first resource group, the first resource group being related to the first indication information.

According to one aspect of the present disclosure, the above method is characterized in that transmission of the first signal is used for indicating the channel occupancy information, the channel occupancy information comprising whether the first subband is idle.

According to one aspect of the present disclosure, the above method is characterized in that the first signaling comprises a first index, the first index being used for indicating a first device group, the first device group comprises at least one node, and the first node belongs to the first device group.

According to one aspect of the present disclosure, the above method is characterized in transmitting a second signaling, the second signaling comprising Q2 piece(s) of transmission configuration information, Q2 being a positive integer, and any one of the Q2 piece(s) of transmission configuration information is used for indicating an Rx parameter of the first channel sensing operation, and the first resource group is related to the second signaling.

According to one aspect of the present disclosure, the above method is characterized in that the first indication information is related to the result of the second channel sensing operation.

According to one aspect of the present disclosure, the above method is characterized in that the first device group comprises multiple nodes, and the multiple nodes employ resources overlapping with the first resource group for transmitting a feedback signal.

According to one aspect of the present disclosure, the above method is characterized in that the first signal comprises Q3 repetitions of a first sub-signal, Q3 being a positive integer greater than 1.

The present disclosure provides a first node for wireless communications, comprising:
    a first receiver, which receives a first signaling;
    a second receiver, which performs a first channel sensing operation over a first subband; and
    a first transmitter, which transmits a first signal;
    herein, the first signaling comprises first indication information, the first indication information being used for indicating an Rx parameter of the first channel sensing operation; the first channel sensing operation is used for determining channel occupancy information, and the channel occupancy information is used for determining whether the first subband can be used by a transmitter of the first signaling for signal transmission; the first signal is used for indicating the channel occupancy information; the first signaling is used for determining Q1 candidate resource groups, Q1 being a positive integer greater than 1; a first resource group is one of the Q1 candidate resource groups, and the first signal occupies the first resource group, the first resource group being related to the first indication information.

The present disclosure provides a second node for wireless communications, comprising:
    a third receiver, which performs a second channel sensing operation over a first subband;
    a second transmitter, which transmits a first signaling; and
    a fourth receiver, which receives a first signal;
    herein, the first signaling comprises first indication information, the first indication information being used for indicating an Rx parameter of a first channel sensing operation; the first channel sensing operation is used for determining channel occupancy information, and the channel occupancy information is used for determining whether the first subband can be used by the second node for signal transmission; the first signal is used for indicating the channel occupancy information; the first signaling is used for determining Q1 candidate resource groups, Q1 being a positive integer greater than 1; a first resource group is one of the Q1 candidate resource groups, and the first signal occupies the first resource group, the first resource group being related to the first indication information.

In one embodiment, the present disclosure has the following advantages:
    triggering the first node to perform LBT and indicating Rx parameters of the LBT through a first signaling, the Rx parameters depending on the LBT's direction, thus reducing or even avoiding hidden node issues in the scenario of directional LBT.
    first indication information being used for determining the first resource group employed by a first signal out of multiple candidate resource groups, so that the first signal can be correctly received by the second node.
    carrying feedback information according to whether a first signal is transmitted or not, so as to avoid interferences to other communication nodes when the first signal is not transmitted, especially when the LBT result shows that there are other nodes in communication.
    the first signaling can be a groupcast signaling, which can indicate multiple nodes in performing channel sensing operations and sending results back, thereby improving the LBT performance and reducing signaling overhead.
    a first node determining an effective Rx parameter in a first signaling according to a pre-indicated candidate Rx parameter in a second signaling, so as to avoid confusions about the information contained in the first signaling when sent to different nodes.
    multiple nodes employing the same resources to transmit a feedback signal of LBT, thus conserving resources.
    the feedback signal of LBT being composed of multiple repetitions of a first sub-signal so as to meet requirements of spectrum regulations for time and frequency occupancy rates, and to improve performance through multiple transmissions.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
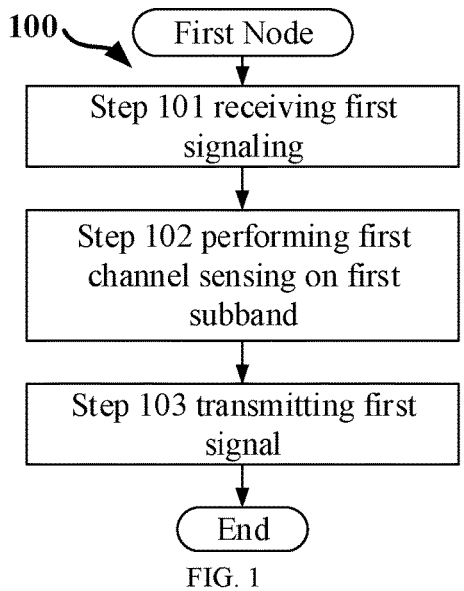
FIG. 1 illustrates a flowchart of processing of a first node according to one embodiment of the present disclosure.

Embodiment 1 illustrates a flowchart of processing of a first node according to one embodiment of the present disclosure, as shown in FIG. 1. In FIG. 1, each box represents a step. Particularly, the order in which the boxes are arranged does not imply a chronological sequence of each step respectively marked. In Embodiment 1, the first node in the present disclosure receives a first signaling in step 101 and performs a first channel sensing operation over a first subband in step 102, and transmits a first signal in step 103. In this embodiment, the first signaling comprises first indication information, the first indication information being used for indicating an Rx parameter of the first channel sensing operation; the first channel sensing operation is used for determining channel occupancy information, and the channel occupancy information is used for determining whether the first subband can be used by a transmitter of the first signaling for signal transmission; the first signal is used for indicating the channel occupancy information; the first signaling is used for determining Q1 candidate resource groups, Q1 being a positive integer greater than 1; a first resource group is one of the Q1 candidate resource groups, and the first signal occupies the first resource group, the first resource group being related to the first indication information.

In one embodiment, the signaling is a dynamic signaling.

In one embodiment, the signaling is a layer 1 (L1) signaling.

In one embodiment, the signaling is a L1 control signaling.

In one embodiment, the signaling is transmitted on Sidelink.

In one embodiment, the signaling is transmitted via a PC5 interface.

In one embodiment, the signaling is transmitted on Down-Link.

In one embodiment, the signaling is transmitted via a Uu interface.

In one embodiment, the signaling is transmitted via Unicast.

In one embodiment, the signaling is transmitted via Groupcast.

In one embodiment, the signaling is transmitted via Broadcast.

In one embodiment, the signaling is cell-specific.

In one embodiment, the signaling is UE-specific.

In one embodiment, the signaling comprises all or part of a higher layer signaling.

In one embodiment, the signaling comprises all or part of a Radio Resource Control (RRC) layer signaling.

In one embodiment, the signaling comprises one or more fields in an RRC Information Element (IE).

In one embodiment, the signaling comprises one or more fields in a System Informant Block (SIB).

In one embodiment, the signaling comprises all or part of a MAC layer signaling.

In one embodiment, the signaling comprises one or more fields in a MAC Control Element (CE).

In one embodiment, the signaling comprises one or more fields in a physical (PHY) layer signaling.

In one embodiment, the signaling comprises Sidelink Control Information (SCI).

In one embodiment, the signaling comprises one or more fields in a piece of SCI.

In one embodiment, the signaling comprises one or more fields in an SCI format.

In one embodiment, the signaling comprises Downlink Control Information (DCI).

In one embodiment, the signaling comprises one or more fields in a piece of DCI.

In one embodiment, the signaling is semi-statically configured.

In one embodiment, the signaling is dynamically configured.

In one embodiment, the signaling is transmitted on a Physical Downlink Control Channel (PDCCH).

In one embodiment, the signaling is transmitted on a Physical Downlink Shared Channel (PDSCH).

In one embodiment, the signaling is transmitted on a Physical Sidelink Shared Channel (PSSCH).

In one embodiment, the signaling is transmitted on a Physical Sidelink Control Channel (PSCCH).

In one embodiment, the signaling is a Group-Common PDCCH.

In one embodiment, the signaling is a DCI format 2_X, X being an integer.

In one embodiment, the first signal comprises a baseband signal.

In one embodiment, the first signal comprises a radio signal.

In one embodiment, the first signal is transmitted on SideLink.

In one embodiment, the first signal is transmitted on UpLink.

In one embodiment, the first signal is transmitted on Backhaul Link.

In one embodiment, the first signal is transmitted via a Uu interface.

In one embodiment, the first signal is transmitted via a PC5 interface.

In one embodiment, the first signal is transmitted via Unicast.

In one embodiment, the first signal is transmitted via Groupcast.

In one embodiment, the first signal is transmitted via Broadcast.

In one embodiment, the first signal carries a Transport Block (TB).

In one embodiment, the first signal carries a Code Block (CB).

In one embodiment, the first signal carries a Code Block Group (CBG).

In one embodiment, the first signal comprises Sidelink Control Information (SCI).

In one embodiment, the first signal comprises one or more fields in a piece of SCI.

In one embodiment, the first signal comprises one or more fields in an SCI format.

In one embodiment, the first signal comprises Uplink Control Information (UCI).

In one embodiment, the first signal comprises one or more fields in a piece of UCI.

In one embodiment, the first signal comprises one or more fields in a UCI format.

In one embodiment, the first signal comprises a Physical Uplink Shared Channel (PUSCH).

In one embodiment, the first signal comprises a Physical Uplink Control Channel (PUCCH).

In one embodiment, the first signal comprises a Physical Sidelink Control Channel (PSCCH).

In one embodiment, the first signal comprises a Physical Sidelink Shared Channel (PSSCH).

In one embodiment, the first signal comprises a Physical Sidelink Feedback Channel (PSFCH).

In one embodiment, the first signal comprises a Physical Sidelink Broadcast Channel (PSBCH).

In one embodiment, the first signal is used in a frequency range beyond a first frequency and smaller than a second frequency.

In one embodiment, the first signal is used in a frequency range above 52.6 GHz.

In one embodiment, the first signal is transmitted on Licensed Spectrum.

In one embodiment, the first signal is transmitted on Unlicensed Spectrum.

In one embodiment, an implementor of the first channel sensing operation is the first node.

In one embodiment, the first channel sensing operation includes performing energy detection on the first subband, the energy detection being used for determining whether the first subband is idle.

In one embodiment, frequency resources occupied by the first signaling belong to the first subband.

In one embodiment, frequency resources occupied by the first signaling don't belong to the first subband.

In one embodiment, frequency resources occupied by the first signal belong to the first subband.

In one embodiment, frequency resources occupied by the second signaling belong to the first subband.

In one embodiment, frequency resources occupied by the second signaling don't belong to the first subband.

In one embodiment, the first channel sensing operation comprises performing N1 energy detection(s) respectively in N1 time sub-pool(s) on the first subband, through which N1 detection value(s) is(are) obtained, N1 being a positive integer.

In one embodiment, multi-antenna-related receptions respectively employed by the N1 energy detections are the same.

In one embodiment, the N1 energy detection(s) is(are) used for determining whether the first subband is idle.

In one embodiment, the N1 energy detection(s) is(are) used for determining whether the first subband can be used by the first node for transmitting a radio signal.

In one embodiment, the N1 energy detection(s) is(are) used for determining whether the first subband can be used by the second node for transmitting a radio signal.

In one embodiment, the N1 energy detection(s) is(are) used for determining whether the first subband can be used by the first node for transmitting a radio signal spatially related to the N energy detection(s).

In one embodiment, the N1 energy detection(s) is(are) used for determining whether the first subband can be used by the second node for transmitting a radio signal spatially related to the N energy detection(s).

In one embodiment, the first subband comprises a frequency range occupied by a positive integer number of RB(s).

In one embodiment, the first subband comprises a bandwidth part (BWP).

In one embodiment, the first subband comprises a Carrier Component (CC).

In one embodiment, the N1 energy detection(s) is(are) energy detection(s) in Listen Before Talk (LBT), for the specific meaning and way of implementation of the LBT, refer to 3GPP TR37.213.

In one embodiment, the N1 energy detection(s) is(are) energy detection(s) in a ClearChannelAssessment (CCA), for the specific meaning and way of implementation of the CCA, refer to 3GPPTR 36.889.

In one embodiment, any of the N1 energy detection(s) is realized by a measurement on Received Signal Strength Indication (RSSI).

In one embodiment, time-domain resources occupied by any of the N1 time sub-pool(s) are continuous.

In one embodiment, the N1 time sub-pools are mutually orthogonal (non-overlapping) in time domain.

In one embodiment, duration time of any of the N1 time sub-pool(s) is either 16 μs or 9 μs.

In one embodiment, at least two time sub-pools of the N1 time sub-pools are of unequal durations.

In one embodiment, any two of the N1 time sub-pools are of equal durations.

In one embodiment, time-domain resources occupied by the N1 time sub-pool(s) are continuous.

In one embodiment, at least two time sub-pools of the N1 time sub-pools occupy time-domain resources that are discontinuous.

In one embodiment, any two of the N1 time sub-pools occupy time-domain resources that are discontinuous.

In one embodiment, any of the N1 time sub-pool(s) is a slot duration.

In one embodiment, any time sub-pool of the N1 time sub-pools other than an earliest time sub-pool is a slot duration.

In one embodiment, there is at least one time sub-pool of the N1 time sub-pools that is of a duration of 16 μs.

In one embodiment, there is at least one time sub-pool of the N1 time sub-pools that is of a duration of 9 μs.

In one embodiment, an earliest time sub-pool of the N1 time sub-pools is of a duration of 16 μs.

In one embodiment, an earliest time sub-pool of the N1 time sub-pools is of a duration of 9 μs.

In one embodiment, the N1 time sub-pool(s) comprises (comprise) listening time in Cat 4 LBT.

In one embodiment, the N1 time sub-pool(s) comprises (comprise) slot durations in a Defer Duration and slot durations in Backoff Time in Cat 4 LBT.

In one embodiment, the N1 time sub-pool(s) comprises (comprise) slot durations in a Defer Duration and slot durations in Backoff Time in Type 1 UL channel access procedure, the first node being a UE.

In one embodiment, the N1 time sub-pool(s) comprises (comprise) slot durations in an initial CCA and an EnhancedClearChannelAssessment (eCCA).

In one embodiment, the N1 energy detection(s) is(are) respectively performed to obtain the N1 detection value(s).

In one embodiment, the N1 detection value(s) is(are) respectively (a) received power(s) obtained by the first node sensing power of all radio signals on the first subband in N1 time unit(s) and averaging in time; the N1 time unit(s) is(are) respectively (a) consecutive time duration(s) in the N1 time sub-pool(s).

In one subembodiment, any of the N1 time unit(s) is of a duration no shorter than 4 μs.

In one embodiment, the N1 detection value(s) is(are) respectively (a) received energy (energies) obtained by the first node sensing energy of all radio signals on the first subband in N1 time unit(s) and averaging in time; the N1 time unit(s) is(are) respectively (a) consecutive time duration(s) in the N1 time sub-pool(s).

In one subembodiment, any of the N1 time unit(s) is of a duration no shorter than 4 μs.

In one embodiment, any given energy detection of the N1 energy detection(s) refers to that the first node monitors a received power in a given time unit, and the given time unit is a consecutive time duration in one of the N1 time sub-pool(s) that corresponds to the given energy detection.

In one embodiment, any given energy detection of the N1 energy detection(s) refers to that the first node monitors a received energy in a given time unit, and the given time unit is a consecutive time duration in one of the N1 time sub-pool(s) that corresponds to the given energy detection.

In one embodiment, the channel occupancy information is a piece of UCI.

In one embodiment, the channel occupancy information is a field in UCI.

In one embodiment, the channel occupancy information is a piece of SCI.

In one embodiment, the channel occupancy information is a field in SCI.

In one embodiment, the channel occupancy information comprises a first state and a second state.

In one embodiment, the channel occupancy information is represented by 1 bit.

In one embodiment, the channel occupancy information is represented by 1 bit, with 0 representing a first state and 1 representing a second state.

In one embodiment, transmission of the first signal is used for indicating the channel occupancy information.

In one embodiment, when the first signal is transmitted, the channel occupancy information is a first state; when the first signal is not transmitted, the channel occupancy information is a second state.

In one subembodiment, the first state is an idle state.
In one subembodiment, the first state is a non-idle state.
In one subembodiment, the first state is a busy state.
In one subembodiment, the first state is an occupied state.
In one subembodiment, the second state is an idle state.
In one subembodiment, the second state is a non-idle state.
In one subembodiment, the second state is a busy state.
In one subembodiment, the second state is an occupied state.

In one embodiment, the channel occupancy information is determined by the N1 energy detection(s).

In one embodiment, the candidate resource group comprises time-frequency-domain resources.

In one embodiment, the candidate resource group comprises code-domain resources.

In one embodiment, the candidate resource group comprises a positive integer number of RE(s).

In one embodiment, the candidate resource group comprises a slot in time domain.

In one embodiment, the candidate resource group comprises a sub-frame in time domain.

In one embodiment, the candidate resource group comprises a positive integer number of consecutive multicarrier symbols.

In one embodiment, the candidate resource group comprises a positive integer number of consecutive slots.

In one embodiment, the candidate resource group comprises a sub-channel in frequency domain.

In one embodiment, the candidate resource group comprises a PRB in frequency domain.

In one embodiment, the candidate resource group comprises a positive integer number of consecutive subcarriers in frequency domain.

In one embodiment, the candidate resource group comprises a positive integer number of consecutive PRBs in frequency domain.

In one embodiment, the candidate resource group comprises a positive integer number of consecutive sub-channels in frequency domain.

In one embodiment, the candidate resource group comprises a positive integer number of sequence(s) in code domain.

In one embodiment, the candidate resource group comprises a positive integer number of code(s) in code domain.

In one embodiment, the candidate resource group comprises a positive integer number of Zadoff-Chu sequence(s) in code domain.

In one embodiment, the candidate resource group comprises a positive integer number of pseudo-random sequence(s) in code domain.

In one embodiment, the candidate resource group comprises a positive integer number of computer-generated sequence(s) in code domain.

In one embodiment, the candidate resource group comprises a positive integer number of Gold sequence(s) in code domain.

In one embodiment, the candidate resource group comprises a positive integer number of M sequence(s) in code domain.

Embodiment 2

Figure 2:
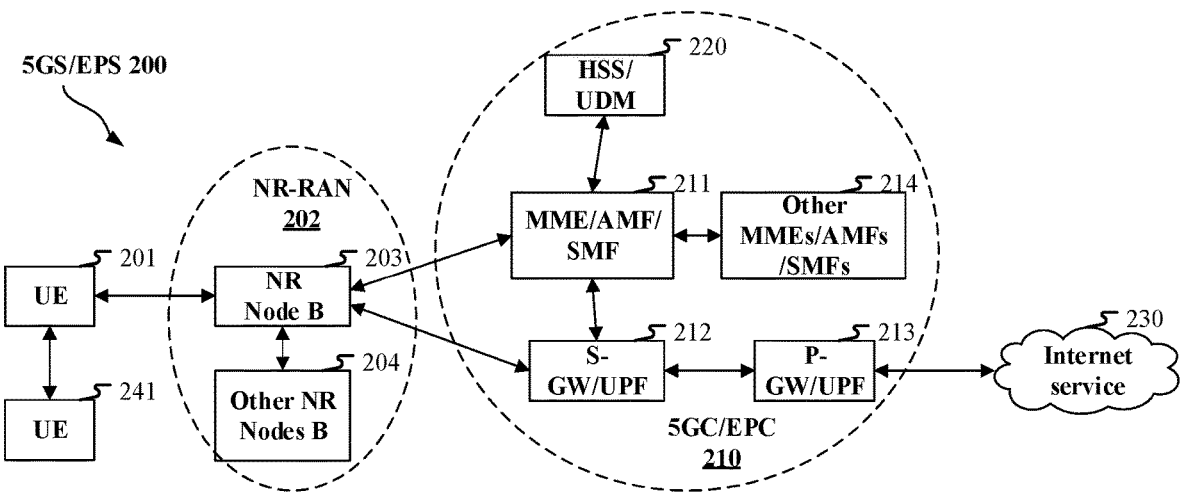
FIG. 2 illustrates a schematic diagram of a network architecture according to one embodiment of the present disclosure.

Embodiment 2 illustrates a schematic diagram of a network architecture, as shown in FIG. 2. FIG. 2 is a diagram illustrating a network architecture 200 of 5G NR, Long-Term Evolution (LTE), and Long-Term Evolution Advanced (LTE-A) systems. The 5G NR or LTE network architecture 200 may be called a 5G System/Evolved Packet System (5GS/EPS) 200 or other appropriate terms, which may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPS), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the first node in the present disclosure includes the UE 201.

In one embodiment, the second node in the present disclosure includes the gNB 203.

In one embodiment, the second node in the present disclosure includes the UE 241.

In one embodiment, the first node in the present disclosure includes the gNB 203.

In one embodiment, the second node in the present disclosure includes the UE 201.

In one embodiment, the second node in the present disclosure includes the gNB 204.

In one embodiment, the UE in the present disclosure includes the UE 201.

In one embodiment, the UE in the present disclosure includes the UE 241.

In one embodiment, the base station in the present disclosure includes the gNB 203.

In one embodiment, the base station in the present disclosure includes the gNB 204.

In one embodiment, the UE 201 supports sidelink transmission.

In one embodiment, the UE 201 supports a PC5 interface.

In one embodiment, the UE 201 supports a Uu interface.

In one embodiment, the UE 241 supports sidelink transmission.

In one embodiment, the UE 241 supports a PC5 interface.

In one embodiment, the gNB 203 supports a Uu interface.

In one embodiment, the gNB 203 supports Integrated Access and Backhaul (IAB).

In one embodiment, the gNB 204 supports IAB.

In one embodiment, the transmitter of the first signal in the present disclosure includes the gNB 203.

In one embodiment, the transmitter of the first signal in the present disclosure includes the UE 241.

In one embodiment, the transmitter of the first signal in the present disclosure includes the UE 201.

In one embodiment, the transmitter of the first signal in the present disclosure includes the gNB 204.

In one embodiment, the receiver of the first signal in the present disclosure includes the UE 201.

In one embodiment, the receiver of the first signal in the present disclosure includes the gNB 203.

In one embodiment, the transmitter of the first signaling in the present disclosure includes the gNB 203.

In one embodiment, the transmitter of the first signaling in the present disclosure includes the UE 241.

In one embodiment, the transmitter of the first signaling in the present disclosure includes the UE 201.

In one embodiment, the transmitter of the first signaling in the present disclosure includes the gNB 204.

In one embodiment, the receiver of the first signaling in the present disclosure includes the UE 201.

In one embodiment, the receiver of the first signaling in the present disclosure includes the gNB 203.

In one embodiment, the transmitter of the second signaling in the present disclosure includes the gNB 203.

In one embodiment, the transmitter of the second signaling in the present disclosure includes the UE 241.

In one embodiment, the transmitter of the second signaling in the present disclosure includes the UE 201.

In one embodiment, the transmitter of the second signaling in the present disclosure includes the gNB 204.

In one embodiment, the receiver of the second signaling in the present disclosure includes the UE 201.

In one embodiment, the receiver of the second signaling in the present disclosure includes the gNB 203.

Embodiment 3

Figure 3:
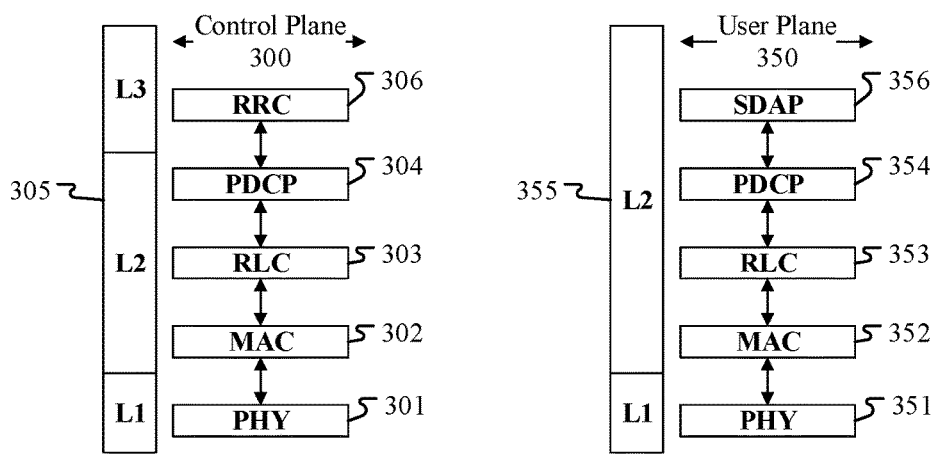
FIG. 3 illustrates a schematic diagram of a radio protocol architecture of a user plane and a control plane according to one embodiment of the present disclosure.

Embodiment 3 illustrates a schematic diagram of an embodiment of a radio protocol architecture of a user plane and a control plane according to the present disclosure, as shown in FIG. 3. FIG. 3 is a schematic diagram illustrating an example of a radio protocol architecture of a user plane 350 and a control plane 300. In FIG. 3, the radio protocol architecture for a control plane 300 between a first node (UE or RSU in V2X, or vehicle-mounted equipment or vehicle-mounted communication modules) and a second node (gNB, UE, or RSU in V2X, or vehicle-mounted equipment or vehicle-mounted communication modules), or between two UEs is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first node and the second node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second nodes of the network side. The PDCP sublayer 304 provides data encryption and integrity protection, and also provides support for handover of a second node between first nodes. The RLC sublayer 303 provides segmentation and reassembling of a packet, retransmission of a lost packet through ARQ, and detection of duplicate packets and protocol errors. The MAC sublayer 302 provides mapping between a logical channel and a transport channel as well as multiplexing between logical channels. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signal in the present disclosure is generated by the PHY 351.

In one embodiment, the first signal in the present disclosure is generated by the MAC 352.

In one embodiment, the first signal in the present disclosure is generated by the PHY 301.

In one embodiment, the first signal in the present disclosure is generated by the MAC 302.

In one embodiment, the first signal in the present disclosure is generated by the RRC 306.

In one embodiment, the first signaling in the present disclosure is generated by the PHY 351.

In one embodiment, the first signaling in the present disclosure is generated by the MAC 352.

In one embodiment, the first signaling in the present disclosure is generated by the PHY 301.

In one embodiment, the first signaling in the present disclosure is generated by the MAC 302.

In one embodiment, the first signaling in the present disclosure is generated by the RRC 306.

In one embodiment, the second signaling in the present disclosure is generated by the PHY 351.

In one embodiment, the second signaling in the present disclosure is generated by the MAC 352.

In one embodiment, the second signaling in the present disclosure is generated by the PHY 301.

In one embodiment, the second signaling in the present disclosure is generated by the MAC 302.

In one embodiment, the second signaling in the present disclosure is generated by the RRC 306.

Embodiment 4

Figure 4:
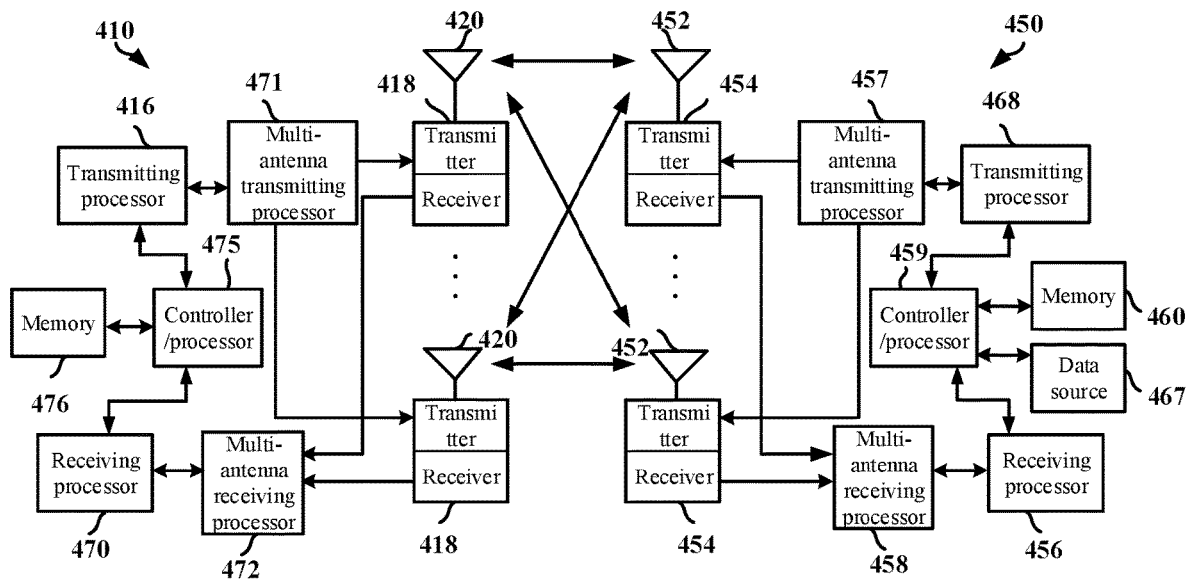
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 implements the functionality of the L2 layer. The controller/processor 475 provides header compression, encryption, packet segmentation and reordering, and multiplexing between a logical channel and a transport channel, and radio resource allocation of the second communication device 450 based on various priorities. The controller/processor 475 is also in charge of a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In a transmission between the first communication device 410 and the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission between the second communication device 450 and the first communication device 410, the controller/processor 475 provides de-multiplexing between a transport channel and a logical channel, packet reassembling, decrypting, header decompression, control signal processing so as to recover a higher-layer packet from the second communication device 450. The higher-layer packet coming from the controller/processor 475 may be provided to the core network.

In one embodiment, the first node in the present disclosure includes the second communication device 450, and the second node in the present disclosure includes the first communication device 410.

In one embodiment, the first node in the present disclosure includes the first communication device 410, and the second node in the present disclosure includes the second communication device 450.

In one subembodiment, the first node is a UE, and the second node is a UE.

In one subembodiment, the first node is a UE, and the second node is a relay node.

In one subembodiment, the first node is a UE, and the second node is a base station.

In one subembodiment, the first node is a relay node, and the second node is a base station.

In one subembodiment, the first node is a base station, and the second node is a base station.

In one subembodiment, the second communication device 450 comprises at least one controller/receiver; the at least one controller/processor is in charge of HARQ operation.

In one subembodiment, the first communication device 410 comprises at least one controller/receiver; the at least one controller/processor is in charge of HARQ operation.

In one subembodiment, the first communication device 410 comprises at least one controller/receiver; the at least one controller/processor is in charge of error detection using ACK and/or NACK protocols as a way to support HARQ operation.

In one embodiment, the second communication device 450 comprises at least one processor and at least one memory, the at least one memory comprises computer program codes; the at least one memory and the computer program codes are configured to be used in collaboration with the at least one processor, the second communication device 450 at least receives a first signaling; performs a first channel sensing operation over a first subband; and transmits a first signal; herein, the first signaling comprises first indication information, the first indication information being used for indicating an Rx parameter of the first channel sensing operation; the first channel sensing operation is used for determining channel occupancy information, and the channel occupancy information is used for determining whether the first subband can be used by a transmitter of the first signaling for signal transmission; the first signal is used for indicating the channel occupancy information; the first signaling is used for determining Q1 candidate resource groups, Q1 being a positive integer greater than 1; a first resource group is one of the Q1 candidate resource groups, and the first signal occupies the first resource group, the first resource group being related to the first indication information.

In one embodiment, the second communication device 450 comprises a memory that stores computer readable instruction program, the computer readable instruction program generates actions when executed by at least one processor, which include: receiving a first signaling; performing a first channel sensing operation over a first subband; and transmitting a first signal; herein, the first signaling comprises first indication information, the first indication information being used for indicating an Rx parameter of the first channel sensing operation; the first channel sensing operation is used for determining channel occupancy information, and the channel occupancy information is used for determining whether the first subband can be used by a transmitter of the first signaling for signal transmission; the first signal is used for indicating the channel occupancy information; the first signaling is used for determining Q1 candidate resource groups, Q1 being a positive integer greater than 1; a first resource group is one of the Q1 candidate resource groups, and the first signal occupies the first resource group, the first resource group being related to the first indication information.

In one embodiment, the first communication device 410 comprises at least one processor and at least one memory, the at least one memory comprises computer program codes; the at least one memory and the computer program codes are configured to be used in collaboration with the at least one processor. The first communication device 410 at least performs a second channel sensing operation over a first subband; transmits a first signaling; and receives a first signal; herein, the first signaling comprises first indication information, the first indication information being used for indicating an Rx parameter of a first channel sensing operation; the first channel sensing operation is used for determining channel occupancy information, and the channel occupancy information is used for determining whether the first subband can be used by the second node for signal transmission; the first signal is used for indicating the channel occupancy information; the first signaling is used for determining Q1 candidate resource groups, Q1 being a positive integer greater than 1; a first resource group is one of the Q1 candidate resource groups, and the first signal occupies the first resource group, the first resource group being related to the first indication information.

In one embodiment, the first communication device 410 comprises a memory that stores computer readable instruction program, the computer readable instruction program generates actions when executed by at least one processor, which include: performing a second channel sensing operation over a first subband; transmitting a first signaling; and receiving a first signal; herein, the first signaling comprises first indication information, the first indication information being used for indicating an Rx parameter of a first channel sensing operation; the first channel sensing operation is used for determining channel occupancy information, and the channel occupancy information is used for determining whether the first subband can be used by the second node for signal transmission; the first signal is used for indicating the channel occupancy information; the first signaling is used for determining Q1 candidate resource groups, Q1 being a positive integer greater than 1; a first resource group is one of the Q1 candidate resource groups, and the first signal occupies the first resource group, the first resource group being related to the first indication information.

In one embodiment, at least one of the antenna 452, the receiver 454, the multi-antenna receiving processor 458, the receiving processor 456, the controller/processor 459, the memory 460 or the data source 467 is used for receiving the first signal in the present disclosure.

In one embodiment, at least one of the antenna 452, the receiver 454, the multi-antenna receiving processor 458, the receiving processor 456, the controller/processor 459, the memory 460 or the data source 467 is used for receiving the first signaling in the present disclosure.

In one embodiment, at least one of the antenna 452, the receiver 454, the multi-antenna receiving processor 458, the receiving processor 456, the controller/processor 459, the memory 460 or the data source 467 is used for receiving the second signaling in the present disclosure.

In one embodiment, at least one of the antenna 420, the receiver 418, the multi-antenna receiving processor 472, the receiving processor 470, the controller/processor 475 or the memory 476 is used for transmitting the first signal in the present disclosure.

In one embodiment, at least one of the antenna 420, the receiver 418, the multi-antenna receiving processor 472, the receiving processor 470, the controller/processor 475 or the memory 476 is used for transmitting the first signaling in the present disclosure.

In one embodiment, at least one of the antenna 420, the receiver 418, the multi-antenna receiving processor 472, the receiving processor 470, the controller/processor 475 or the memory 476 is used for transmitting the second signaling in the present disclosure.

Embodiment 5

Figure 5:
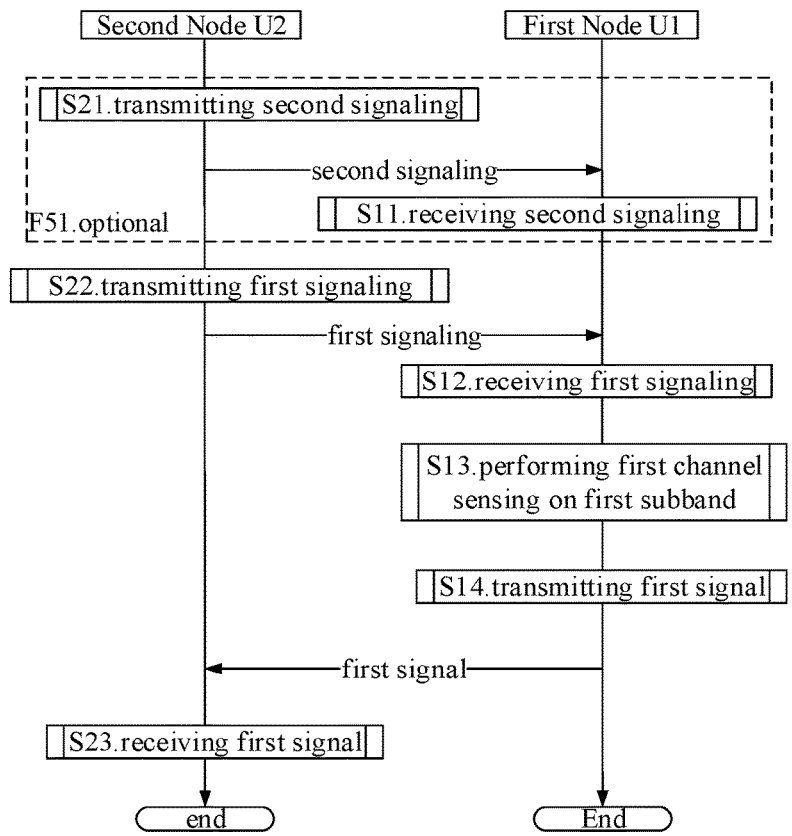
FIG. 5 illustrates a flowchart of radio signal transmission according to one embodiment of the present disclosure.

Embodiment 5 illustrates a flowchart of radio signal transmission according to one embodiment of the present disclosure, as shown in FIG. 5. In FIG. 5, a first node U1 and a second node U2 are in communication via an air interface. In FIG. 5, the orders of steps marked by the boxes do not represent specific chronological relations among these steps.

The first node U1 receives a second signaling in step S11; and receives a first signaling in step S12; performs a first channel sensing operation over a first subband in step S13; and transmits a first signal in step S14. The second node U2 transmits a second signaling in step S21; transmits a first signaling in step S22; and receives a first signal in step S23. Herein, the step S21 and the step S11 contained by the broken-line framed box F51 are optional.

In Embodiment 5, the first signaling comprises first indication information, the first indication information being used for indicating an Rx parameter of the first channel sensing operation; the first channel sensing operation is used for determining channel occupancy information, and the channel occupancy information is used for determining whether the first subband can be used by a transmitter of the first signaling for signal transmission; the first signal is used for indicating the channel occupancy information; the first signaling is used for determining Q1 candidate resource groups, Q1 being a positive integer greater than 1; a first resource group is one of the Q1 candidate resource groups, and the first signal occupies the first resource group, the first resource group being related to the first indication information. The second signaling comprises Q2 piece(s) of transmission configuration information, Q2 being a positive integer, and any one of the Q2 piece(s) of transmission configuration information is used for indicating an Rx parameter of the first channel sensing operation, and the first resource group is related to the second signaling.

In one embodiment, an air interface between the second node U2 and the first node U1 includes a PC5 interface.

In one embodiment, an air interface between the second node U2 and the first node U1 includes a sidelink.

In one embodiment, an air interface between the second node U2 and the first node U1 includes a Uu interface.

In one embodiment, an air interface between the second node U2 and the first node U1 includes a cellular link.

In one embodiment, an air interface between the second node U2 and the first node U1 includes a wireless interface between a UE and a UE.

In one embodiment, an air interface between the second node U2 and the first node U1 includes a wireless interface between a base station and a UE.

In one embodiment, the first node in the present disclosure is a terminal.

In one embodiment, the first node in the present disclosure is a car.

In one embodiment, the first node in the present disclosure is a vehicle.

In one embodiment, the first node in the present disclosure is a Road Side Unit (RSU).

In one embodiment, the first node in the present disclosure is a base station.

In one embodiment, the second node in the present disclosure is a terminal.

In one embodiment, the second node in the present disclosure is a car.

In one embodiment, the second node in the present disclosure is a vehicle.

In one embodiment, the second node in the present disclosure is an RSU.

In one embodiment, the second node in the present disclosure is a base station.

Embodiment 6

Figure 6:
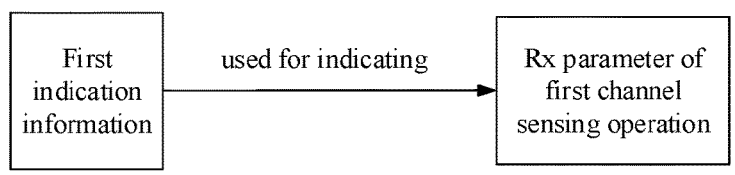
FIG. 6 illustrates a schematic diagram of first indication information according to one embodiment of the present disclosure.

Embodiment 6 illustrates a schematic diagram of first indication information according to one embodiment of the present disclosure, as shown in FIG. 6. In FIG. 6, the first indication information in the present disclosure is used for indicating an Rx parameter of a first channel sensing operation.

In one embodiment, the Rx parameter is used for signal reception.

In one embodiment, the Rx parameter comprises a Transmission Configuration Indicator (TCI).

In one embodiment, the Rx parameter comprises a TCI State.

In one embodiment, the Rx parameter comprises a reception timing.

In one embodiment, the Rx parameter comprises a reception frequency.

In one embodiment, the Rx parameter comprises energy detection parameter configuration.

In one embodiment, the Rx parameter comprises an energy detection threshold.

In one embodiment, the Rx parameter comprises energy detection time window configuration.

In one embodiment, the Rx parameter comprises transmission beam configuration.

In one embodiment, the Rx parameter comprises a transmission beam bandwidth.

In one embodiment, the Rx parameter comprises a transmission beam direction.

In one embodiment, the Rx parameter comprises reception beam configuration.

In one embodiment, the Rx parameter comprises a reception beam bandwidth.

In one embodiment, the Rx parameter comprises a reception beam direction.

In one embodiment, the Rx parameter comprises channel large-scale fading.

In one embodiment, the Rx parameter comprises quasi-co-located (QCL) configuration.

In one embodiment, the Rx parameter comprises a QCL type.

In one embodiment, the Rx parameter is associated with a reference signal resource.

In one embodiment, the Rx parameter is associated with a CSI-RS resource.

In one embodiment, the Rx parameter is associated with an SSB resource.

In one embodiment, the Rx parameter is associated with an SSB index.

In one embodiment, the Rx parameter of the first channel sensing operation is related to the Rx parameter of the first signaling.

In one embodiment, the Rx parameter of the first channel sensing operation is the same as the Rx parameter of the first signaling.

In one embodiment, the Rx parameter of the first channel sensing operation and the Rx parameter of the first signaling are QCL.

In one embodiment, the Rx parameter of the first channel sensing operation contains the Rx parameter of the first signaling.

In one embodiment, the phrase of performing a first channel sensing operation over a first subband in the present disclosure includes performing a first channel sensing operation over a first subband based on the Rx parameter of the first channel sensing operation indicated by the first indication information.

In one embodiment, the phrase of performing a first channel sensing operation over a first subband in the present disclosure includes performing a first channel sensing operation over a first subband based on a hypothesis of the Rx parameter of the first channel sensing operation indicated by the first indication information.

In one embodiment, the first indication information is a field in a first signaling.

In one embodiment, the first indication information is used for determining an Rx parameter index, and the Rx parameter index belongs to an Rx parameter index set, the Rx parameter index set comprising multiple Rx parameter indexes, any Rx parameter index in the Rx parameter index set being associated with one of the Rx parameters of the first channel sensing operation.

In one subembodiment, the first indication information is used for determining an Rx parameter index.

In one subembodiment, the first indication information is used for determining multiple Rx parameter indexes.

In one embodiment, the first indication information is used for indicating one of the Rx parameters of the first channel sensing operation.

In one embodiment, the first indication information is used for indicating multiple of the Rx parameters of the first channel sensing operation.

Embodiment 7

Figure 7:
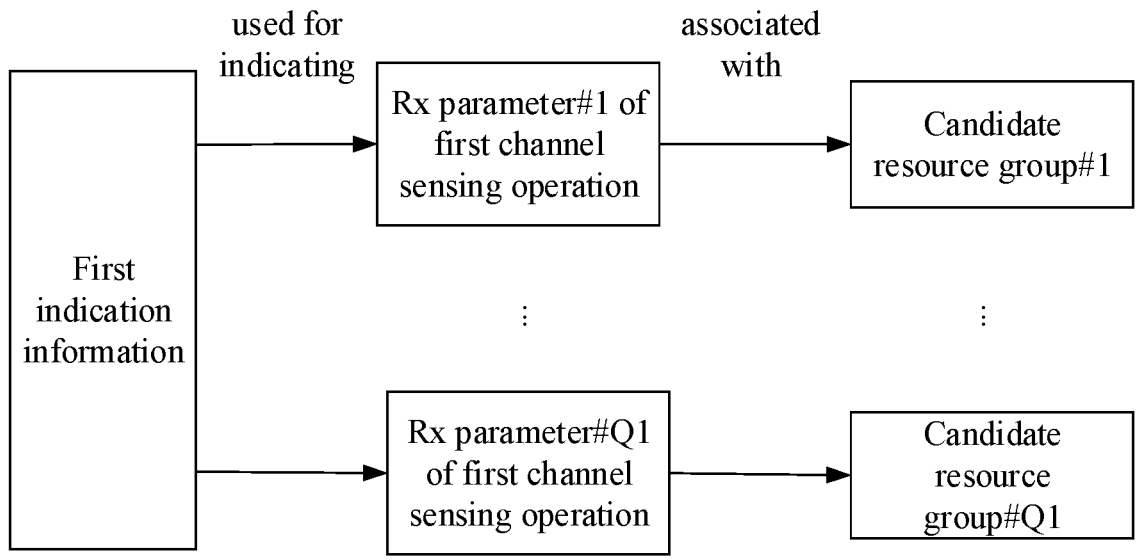
FIG. 7 illustrates a schematic diagram of relationship between first indication information and Q1 candidate resource groups according to one embodiment of the present disclosure.

Embodiment 7 illustrates a schematic diagram of relationship between first indication information and Q1 candidate resource groups according to one embodiment of the present disclosure, as shown in FIG. 7. In FIG. 7, the first indication information is used for indicating Q1 Rx parameters of a first channel sensing operation, and the Q1 Rx parameters of the first channel sensing operation are differentiated by a suffix # and numbers, respectively, Q1 being a positive integer greater than 1. The Q1 Rx parameters of the first channel sensing operation are respectively associated with Q1 candidate resource groups, and the Q1 candidate resource groups are differentiated by a suffix # and numbers, respectively.

In one embodiment, the phrase that the first signaling is used for determining Q1 candidate resource groups in the present disclosure includes that the first indication information comprised in the first signaling is used for determining Q1 candidate resource groups.

In one embodiment, the first indication information is associated with the candidate resource group.

In one embodiment, the first indication information is used for determining time-domain resources in the candidate resource group.

In one embodiment, the first indication information is used for determining frequency-domain resources in the candidate resource group.

In one embodiment, the first indication information is used for determining code-domain resources in the candidate resource group.

In one embodiment, the first indication information is used for indicating multiple Rx parameters of the first channel sensing operation, and multiple candidate resource groups respectively associated with the multiple Rx parameters of the first channel sensing operation are different.

In one embodiment, the first indication information is used for indicating multiple Rx parameters of the first channel sensing operation, and multiple candidate resource groups respectively associated with the multiple Rx parameters of the first channel sensing operation are the same.

In one embodiment, multiple candidate resource groups respectively associated with the first indication information have at least one same domain resource out of a frequency-domain resource, a time-domain resource or a code-domain resource.

In one embodiment, the first indication information is used for indicating multiple Rx parameters of the first channel sensing operation and multiple candidate resource groups respectively associated with multiple Rx parameters of the first channel sensing operation comprise different time-domain resources.

In one embodiment, the first indication information is used for indicating multiple Rx parameters of the first channel sensing operation and multiple candidate resource groups respectively associated with multiple Rx parameters of the first channel sensing operation comprise different frequency-domain resources.

In one embodiment, the first indication information is used for indicating multiple Rx parameters of the first channel sensing operation and multiple candidate resource groups respectively associated with multiple Rx parameters of the first channel sensing operation comprise different code-domain resources.

Embodiment 8

Figure 8:
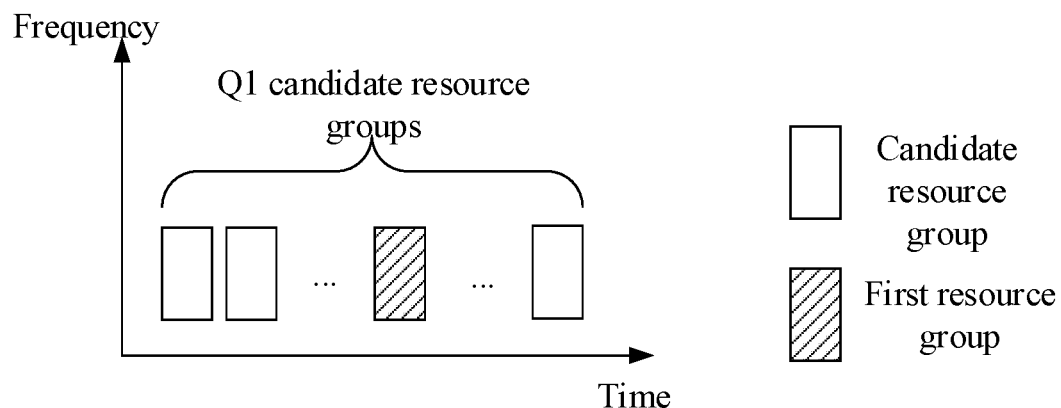
FIG. 8 illustrates a schematic diagram of a first resource group according to one embodiment of the present disclosure.

Embodiment 8 illustrates a schematic diagram of a first resource group according to one embodiment of the present disclosure, as shown in FIG. 8. In FIG. 8, a rectangular box represents a candidate resource group, and a slash-filled rectangular box represents a first resource group. In this embodiment, the first resource group is one of Q1 candidate resource groups, Q1 being an integer greater than 1. The first signal occupies the first resource group, the first resource group being related to the first indication information. It should be noted that the size and position of each box in FIG. 8 are only for the purpose of illustration, so there isn't any limitation to the size or position of time-frequency resources occupied by the candidate resource group shown herein.

In one embodiment, the phrase that a first resource group is related to the first indication information includes that time-domain resources of the first resource group are located after an end time of the first signaling by which the first indication information is contained.

In one embodiment, the phrase that a first resource group is related to the first indication information includes that frequency resources of the first resource group are the same as frequency resources of the first signaling by which the first indication information is contained.

In one embodiment, the phrase that a first resource group is related to the first indication information includes that the first indication information is used for indicating multiple Rx parameters of the first channel sensing operation, and the first resource group is related to one of the multiple Rx parameters of the first channel sensing operation.

In one embodiment, the first indication information is used for indicating N2 Rx parameters of the first channel sensing operation, N2 being an integer greater than 1, and an effective Rx parameter is one of the N2 Rx parameters of the first channel sensing operation.

In one subembodiment, the phrase that a first resource group is related to the first indication information includes that the first resource group is related to the effective Rx parameter.

In one subembodiment, the phrase that a first resource group is related to the first indication information includes that the effective Rx parameter is used for determining a first resource group.

In one subembodiment, the first node performs a first channel sensing operation over the first subband based on the effective Rx parameter, and channel occupancy information corresponding to the first channel sensing operation is the first state illustrated in Embodiment 1.

In one subembodiment, the first node performs a first channel sensing operation over the first subband based on the effective Rx parameter, and channel occupancy information corresponding to the first channel sensing operation is the second state illustrated in Embodiment 1.

In one embodiment, the first device group in the present disclosure comprises multiple nodes, and the multiple nodes employ resources overlapping with the first resource group for transmitting a feedback signal.

In one embodiment, the first device group in the present disclosure comprises multiple nodes, and the multiple nodes employ resources totally overlapping with the first resource group for transmitting a feedback signal.

In one embodiment, the first device group in the present disclosure comprises multiple nodes, and the multiple nodes employ resources partially overlapping with the first resource group for transmitting a feedback signal.

In one embodiment, the first device group in the present disclosure comprises multiple nodes, and any of the multiple nodes performs a first channel sensing operation. When a result of the first channel sensing operation is a first state, any of the multiple nodes employs resources overlapping with the first resource group for transmitting the result of the first channel sensing operation, the first state featured with the same properties as the first state illustrated in any embodiment in the Embodiment 1.

In one embodiment, the first device group in the present disclosure comprises multiple nodes, and any of the multiple nodes performs a first channel sensing operation. When a result of the first channel sensing operation is a second state, any of the multiple nodes employs resources overlapping with the first resource group for transmitting the result of the first channel sensing operation, the second state featured with the same properties as the second state illustrated in any embodiment in the Embodiment 1.

Embodiment 9

Figure 9:
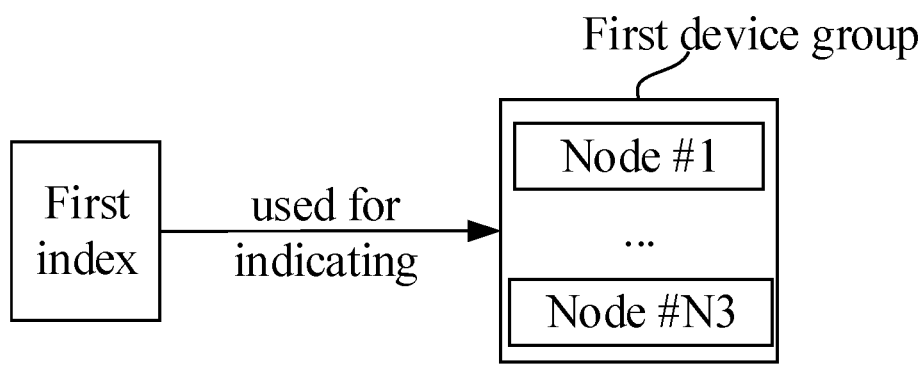
FIG. 9 illustrates a schematic diagram of a first index according to one embodiment of the present disclosure.

Embodiment 9 illustrates a schematic diagram of a first index according to one embodiment of the present disclosure, as shown in FIG. 9. In FIG. 9, a first index is used for indicating a first device group, herein the first device group comprises N3 nodes, the N3 nodes being differentiated by a suffix # and numbers, N3 being an integer greater than 1. The first node in the present disclosure is one of the N3 nodes.

In one embodiment, the first signaling in the present disclosure comprises a first index, the first index being used for indicating a first device group, the first device group comprises at least one node, and the first node belongs to the first device group.

In one embodiment, the first index is determined by a field in the first signaling.

In one embodiment, the first index is determined by a scrambling code of the first signaling.

In one embodiment, the first index is determined by a reference signal of the first signaling.

In one embodiment, the first index is a Radio Network Temporary Identity (RNTI).

In one embodiment, the first index is a Group-RNTI.

In one embodiment, the first index is a Group ID.

In one embodiment, any node of the at least one node comprised in the first device group is a UE.

In one embodiment, any node of the at least one node comprised in the first device group is a relay device.

In one embodiment, any node of the at least one node comprised in the first device group is a network device.

In one embodiment, any node of the at least one node comprised in the first device group is a Transmitter Receiver Point (TRP).

Embodiment 10

Figure 10:
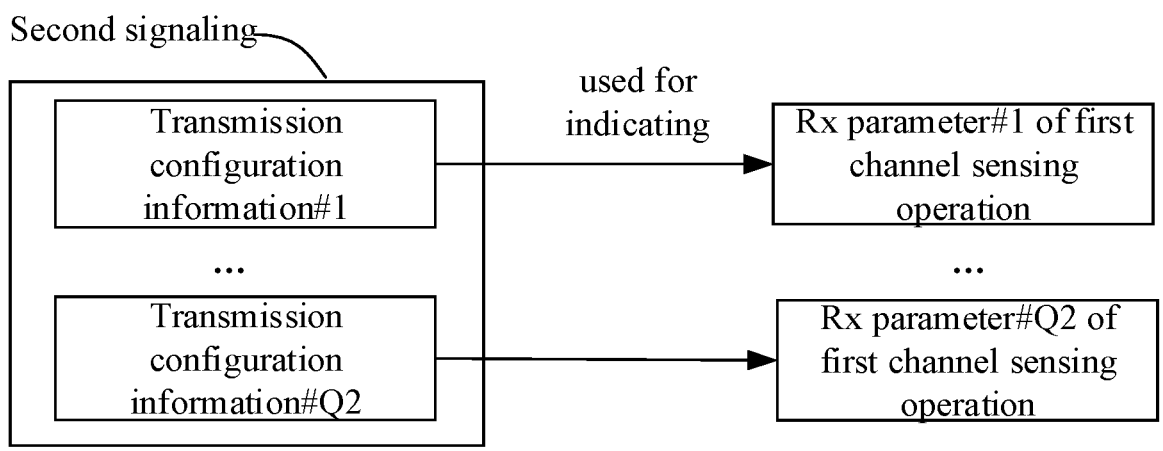
FIG. 10 illustrates a schematic diagram of a second signaling according to one embodiment of the present disclosure.

Embodiment 10 illustrates a schematic diagram of a second signaling according to one embodiment of the present disclosure, as shown in FIG. 10. In FIG. 10, the second signaling comprises Q2 piece(s) of transmission configuration information, Q2 being a positive integer, and any one of the Q2 piece(s) of transmission configuration information is used for indicating an Rx parameter of the first channel sensing operation. In FIG. 10, a suffix # and numbers are used for differentiating multiple pieces of transmission configuration information and multiple Rx parameters of the first channel sensing operation.

In one embodiment, the second signaling is a dynamic signaling.

In one embodiment, the second signaling is a L1 signaling.

In one embodiment, the second signaling is a L1 control signaling.

In one embodiment, the second signaling is transmitted on SideLink.

In one embodiment, the second signaling is transmitted via a PC5 interface.

In one embodiment, the second signaling is transmitted on DownLink.

In one embodiment, the second signaling is transmitted via a Uu interface.

In one embodiment, the second signaling is transmitted via Unicast.

In one embodiment, the second signaling is transmitted via Groupcast.

In one embodiment, the second signaling is transmitted via Broadcast.

In one embodiment, the second signaling is cell-specific.

In one embodiment, the second signaling is UE-specific.

In one embodiment, the second signaling comprises all or part of a higher layer signaling.

In one embodiment, the second signaling comprises all or part of an RRC layer signaling.

In one embodiment, the second signaling comprises one or more fields in an RRC IE.

In one embodiment, the second signaling comprises one or more fields in a SIB.

In one embodiment, the second signaling comprises all or part of a MAC layer signaling.

In one embodiment, the second signaling comprises one or more fields in a MAC CE.

In one embodiment, the second signaling comprises one or more fields in a PHY layer signaling.

In one embodiment, the second signaling comprises SCI.

In one embodiment, the second signaling comprises one or more fields in a piece of SCI.

In one embodiment, the second signaling comprises one or more fields in an SCI format.

In one embodiment, the second signaling comprises DCI.

In one embodiment, the second signaling comprises one or more fields in a piece of DCI.

In one embodiment, the second signaling is semi-statically configured.

In one embodiment, the second signaling is dynamically configured.

In one embodiment, the second signaling is transmitted on a PDCCH.

In one embodiment, the second signaling is transmitted on a PDSCH.

In one embodiment, the second signaling is transmitted on a PSSCH.

In one embodiment, the second signaling is transmitted on a PSCCH.

In one embodiment, the first node performs a first channel sensing operation based on a target Rx parameter, the target Rx parameter belonging to a target Rx parameter set, the target Rx parameter set comprising an overlap between the Rx parameters indicated by the first signaling and the Rx parameters indicated by the second signaling.

In one subembodiment, the Rx parameters indicated by the first signaling comprise the Rx parameter of the first channel sensing operation indicated by the first indication information comprised by the first signaling.

In one subembodiment, the Rx parameters indicated by the first signaling comprise the Rx parameter(s) of the first channel sensing operation respectively indicated by the Q2 piece(s) of transmission configuration information comprised by the second signaling.

In one embodiment, the Q2 piece(s) of transmission configuration information comprised by the second signaling is(are) used for determining an Rx parameter of the first signaling.

In one embodiment, the Q2 piece(s) of transmission configuration information comprised by the second signaling is(are) used for determining a Tx parameter of the first signal.

In one embodiment, any one of the Q2 piece(s) of transmission configuration information comprised by the second signaling is used for reception of a PDCCH.

In one embodiment, any one of the Q2 piece(s) of transmission configuration information comprised by the second signaling is used for reception of a PDSCH.

In one embodiment, any one of the Q2 piece(s) of transmission configuration information comprised by the second signaling is used for reception of a CSI-RS.

In one embodiment, any one of the Q2 piece(s) of transmission configuration information comprised by the second signaling is used for reception of an SSB.

In one embodiment, any one of the Q2 piece(s) of transmission configuration information comprised by the second signaling is used for a measurement on CSI.

In one embodiment, any one of the Q2 piece(s) of transmission configuration information comprised by the second signaling is used for transmission of a PUCCH.

In one embodiment, any one of the Q2 piece(s) of transmission configuration information comprised by the second signaling is used for transmission of a PUSCH.

Embodiment 11

Figure 11:
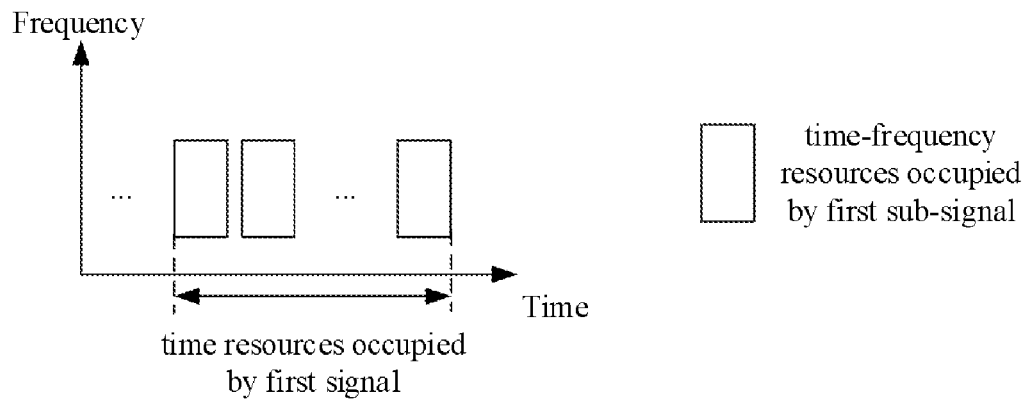
FIG. 11 illustrates a schematic diagram of a first signal according to one embodiment of the present disclosure.
Figure 11:
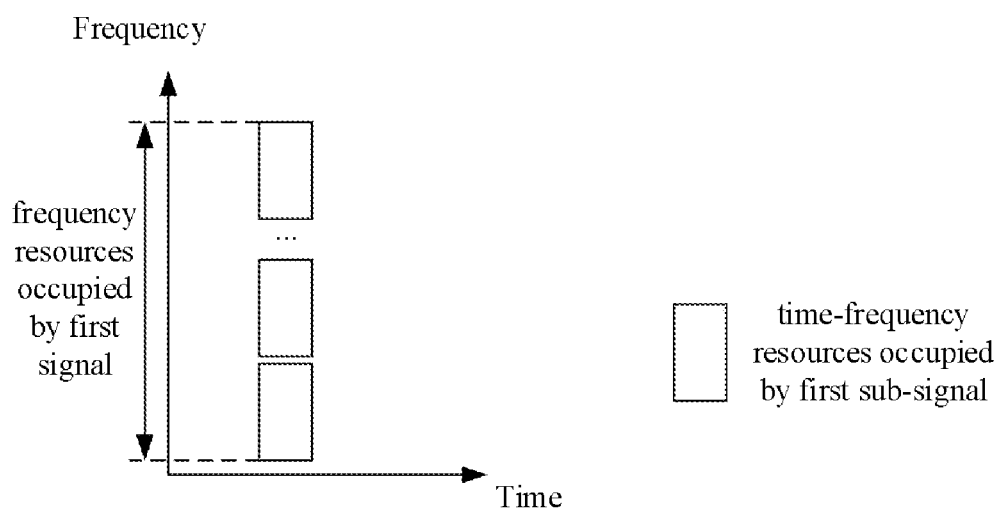
Figure 11:
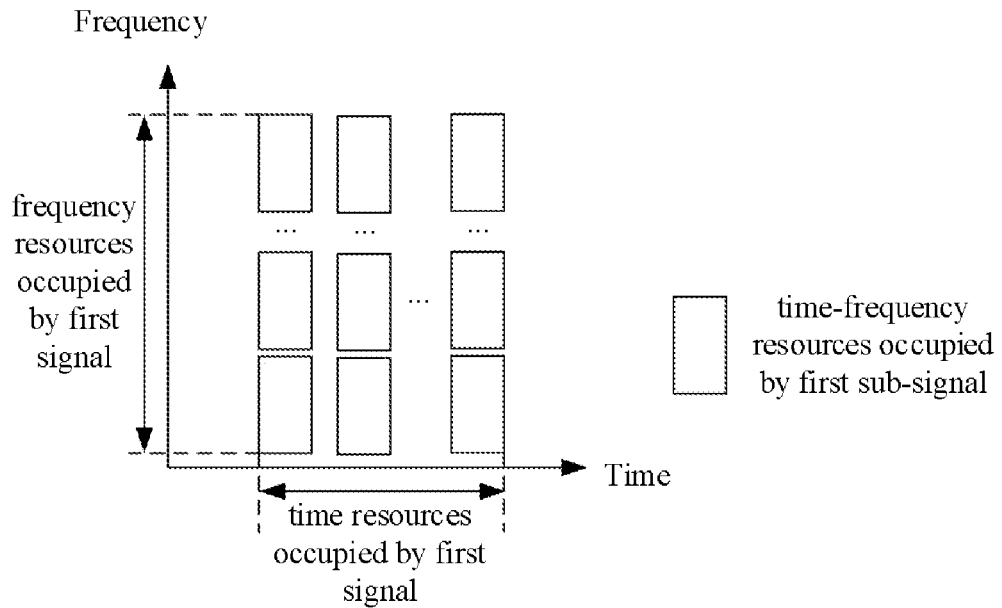

Embodiment 11 illustrates a schematic diagram of a first signal according to one embodiment of the present disclosure, as shown in FIG. 11. In FIG. 11, each blank box represents a first sub-signal, the first signal comprising Q3 repetitions of the first sub-signal, Q3 being a positive integer greater than 1. In FIG. 11-1, the Q3 first sub-signals are repeated in time domain; in FIG. 11-2, the Q3 first sub-signals are repeated in frequency domain; in FIG. 11-3, the Q3 first sub-signals are repeated both in time domain and frequency domain. It should be noted that the size and position of each box in the figure are only for the purpose of illustration, which means neither the size nor the position of time-frequency resources occupied by the candidate resource group are limited by the FIG. 11.

In one embodiment, the first sub-signal comprises the first indication information.

In one embodiment, any two of Q3 pieces of first indication information respectively comprised by the Q3 first sub-signals are the same.

In one embodiment, any two of Q3 pieces of first indication information respectively comprised by the Q3 first sub-signals are different.

In one embodiment, any two of the Q3 pieces of first sub-signals employ a same Modulation and Coding Scheme (MCS).

In one embodiment, any two of the Q3 pieces of first sub-signals employ different MCSs.

In one embodiment, any two of the Q3 pieces of first sub-signals employ a same sequence.

In one embodiment, any two of the Q3 pieces of first sub-signals employ different sequences.

In one embodiment, the first signaling is used for determining a number of time-domain repetitions of the first sub-signal.

In one embodiment, the first signaling is used for determining a number of frequency-domain repetitions of the first sub-signal.

In one embodiment, the number of time-domain repetitions of the first sub-signal is semi-statically configured.

In one embodiment, the number of frequency-domain repetitions of the first sub-signal is semi-statically configured.

In one embodiment, the number of time-domain repetitions of the first sub-signal is pre-defined.

In one embodiment, the number of frequency-domain repetitions of the first sub-signal is pre-defined.

In one embodiment, the number of frequency-domain repetitions of the first sub-signal is determined by frequency-domain occupancy rate of Unlicensed Spectrum.

In one embodiment, the number of time-domain repetitions of the first sub-signal is determined by time-domain occupancy rate of Unlicensed Spectrum.

In one embodiment, the number of frequency-domain repetitions of the first sub-signal is determined by frequency-domain Occupied Channel Bandwidth (OCB) of Unlicensed Spectrum.

In one embodiment, the number of time-domain repetitions of the first sub-signal is determined by time-domain Channel Occupancy Time (COT) of Unlicensed Spectrum.

Embodiment 12

Figure 12:
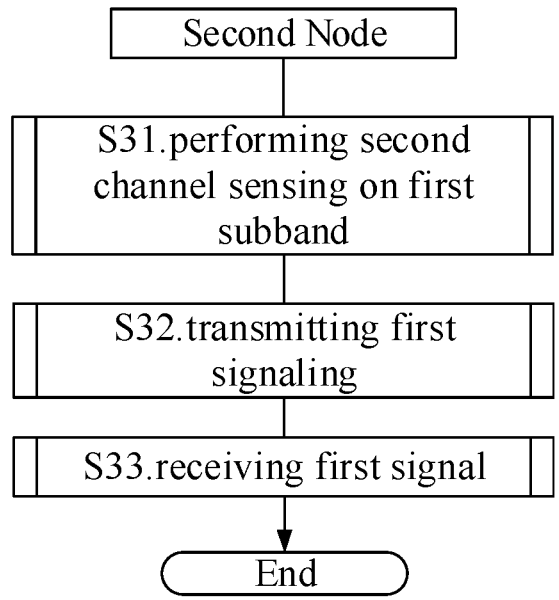
FIG. 12 illustrates a schematic diagram of processing procedures of a second node according to one embodiment of the present disclosure.

Embodiment 12 illustrates a schematic diagram of processing procedures of a second node according to one embodiment of the present disclosure, as shown in FIG. 12.

In FIG. 12, the second node performs a second channel sensing operation over a first subband in step S31; and transmits a first signaling in step S32; and receives a first signal in step S33.

In one embodiment, a start time of the first signaling is after an end time of the second channel sensing operation.

In one embodiment, the second channel sensing operation is used for determining spatial parameters of the first signaling.

In one subembodiment, the spatial parameters of the first signaling include a TCI of the first signaling.

In one subembodiment, the spatial parameters of the first signaling include a TCI state of the first signaling.

In one subembodiment, the spatial parameters of the first signaling include QCL configuration of the first signaling.

In one subembodiment, the spatial parameters of the first signaling include transmission beam configuration of the first signaling.

In one subembodiment, the spatial parameters of the first signaling include reception beam configuration of the first signaling.

In one embodiment, the second channel sensing operation includes performing energy detection on the first subband, and the energy detection is used for determining whether the first subband is idle, the energy detection herein featured with the same properties as the energy detection illustrated in any embodiment in the Embodiment 1.

In one embodiment, the first indication information is related to a result of the second channel sensing operation.

In one embodiment, the second node performs second channel sensing operation based on N4 undetermined Rx parameter(s) to respectively generate N4 result(s) of the second channel sensing operation, N4 being a positive integer, each of the undetermined Rx parameter(s) featured with the same properties as the Rx parameter illustrated in any embodiment in the Embodiment 1.

In one embodiment, the result of the second channel sensing operation includes either a first state or a second state, and the first state and the second state in this embodiment are featured with the same properties as the first state and the second state illustrated in any embodiment in the Embodiment 1.

In one embodiment, the Rx parameter of the first channel sensing operation indicated by the first indication information belongs to a subset of the N4 undetermined Rx parameters, and the result of the second channel sensing operation corresponding to any undetermined Rx parameter in a subset of the N4 undetermined Rx parameters is the first state.

Embodiment 13

Figure 13:
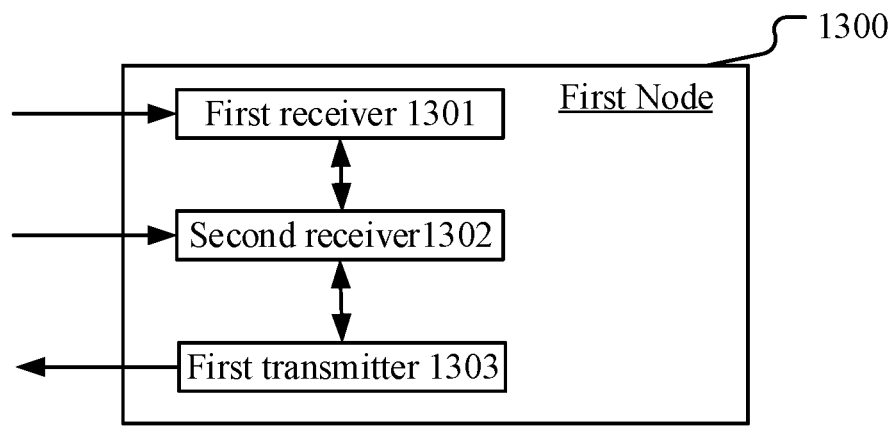
FIG. 13 illustrates a structure block diagram of a processing device in a first node according to one embodiment of the present disclosure.

Embodiment 13 illustrates a structure block diagram of a processing device in a first node, as shown in FIG. 13. In FIG. 13, a first node's processing device 1300 comprises a first receiver 1301, a second receiver 1302 and a first transmitter 1303.

In one embodiment, the first receiver 1301 comprises at least one of the antenna 452, the transmitter/receiver 454, the multi-antenna receiving processor 458, the receiving processor 456, the controller/processor 459, the memory 460 or the data source 467 in FIG. 4 of the present disclosure.

In one embodiment, the second receiver 1302 comprises at least one of the antenna 452, the transmitter/receiver 454, the multi-antenna receiving processor 458, the receiving processor 456, the controller/processor 459, the memory 460 or the data source 467 in FIG. 4 of the present disclosure.

In one embodiment, the first transmitter 1303 comprises at least one of the antenna 420, the transmitter/receiver 418, the multi-antenna transmitting processor 471, the transmitting processor 416, the controller/processor 475 or the memory 476 in FIG. 4 of the present disclosure.

In Embodiment 13, the first receiver 1301 receives a first signaling; the second receiver 1302 performs a first channel sensing operation over a first subband; and the first transmitter 1303 transmits a first signal; herein, the first signaling comprises first indication information, the first indication information being used for indicating an Rx parameter of the first channel sensing operation; the first channel sensing operation is used for determining channel occupancy information, and the channel occupancy information is used for determining whether the first subband can be used by a transmitter of the first signaling for signal transmission; the first signal is used for indicating the channel occupancy information; the first signaling is used for determining Q1 candidate resource groups, Q1 being a positive integer greater than 1; a first resource group is one of the Q1 candidate resource groups, and the first signal occupies the first resource group, the first resource group being related to the first indication information.

In one embodiment, the first node's processing device 1300 is a UE.

In one embodiment, the first node's processing device 1300 is a relay node.

In one embodiment, the first node's processing device 1300 is a base station.

In one embodiment, the first node's processing device 1300 is vehicle-mounted communication equipment.

In one embodiment, the first node's processing device 1300 is a UE supporting V2X communications.

In one embodiment, the first node's processing device 1300 is a relay node supporting V2X communications.

In one embodiment, the first node's processing device 1300 is an IAB-supporting base station.

Embodiment 14

Figure 14:
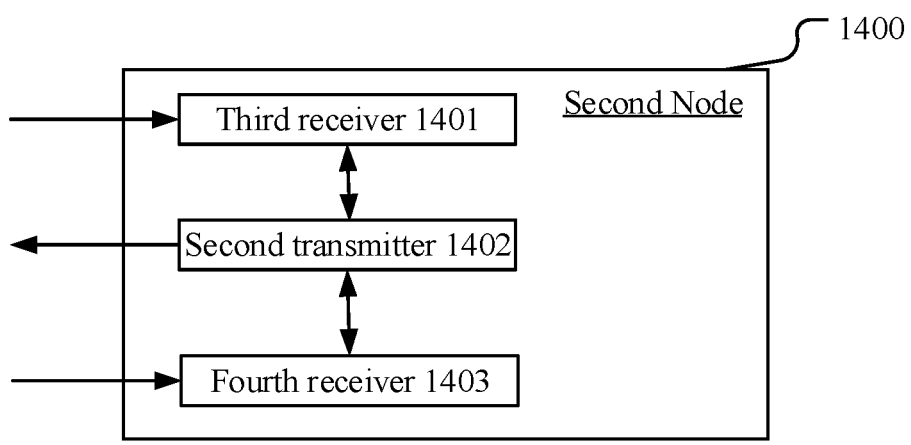
FIG. 14 illustrates a structure block diagram of a processing device in a second node according to one embodiment of the present disclosure.

Embodiment 14 illustrates a structure block diagram of a processing device in a second node, as shown in FIG. 14. In FIG. 14, the second node's processing device 1400 comprises a third receiver 1401, a second transmitter 1402 and a fourth receiver 1403.

In one embodiment, the third receiver 1401 comprises at least one of the antenna 452, the transmitter/receiver 454, the multi-antenna receiving processor 458, the receiving processor 456, the controller/processor 459, the memory 460 or the data source 467 in FIG. 4 of the present disclosure.

In one embodiment, the second transmitter 1402 comprises at least one of the antenna 420, the transmitter/receiver 418, the multi-antenna transmitting processor 471, the transmitting processor 416, the controller/processor 475 or the memory 476 in FIG. 4 of the present disclosure.

In one embodiment, the fourth receiver 1403 comprises at least one of the antenna 452, the transmitter/receiver 454, the multi-antenna receiving processor 458, the receiving processor 456, the controller/processor 459, the memory 460 or the data source 467 in FIG. 4 of the present disclosure.

In Embodiment 14, the third receiver 1401 performs a second channel sensing operation over a first subband; the second transmitter 1402 transmits a first signaling; and the fourth receiver 1403 receives a first signal; herein, the first signaling comprises first indication information; herein, the first signaling comprises first indication information, the first indication information being used for indicating an Rx parameter of a first channel sensing operation; the first channel sensing operation is used for determining channel occupancy information, and the channel occupancy information is used for determining whether the first subband can be used by the second node for signal transmission; the first signal is used for indicating the channel occupancy information; the first signaling is used for determining Q1 candidate resource groups, Q1 being a positive integer greater than 1; a first resource group is one of the Q1 candidate resource groups, and the first signal occupies the first resource group, the first resource group being related to the first indication information.

In one embodiment, transmission of the first signal is used for indicating the channel occupancy information, the channel occupancy information comprising whether the first subband is idle.

In one embodiment, the first signaling comprises a first index, the first index being used for indicating a first device group, the first device group comprises at least one node, and the first node belongs to the first device group.

In one embodiment, the second transmitter 1402 transmits a second signaling, the second signaling comprising Q2 piece(s) of transmission configuration information, Q2 being a positive integer, and any one of the Q2 piece(s) of transmission configuration information is used for indicating an Rx parameter of the first channel sensing operation, and the first resource group is related to the second signaling.

In one embodiment, the first indication information is related to a result of the second channel sensing operation.

In one embodiment, the first device group comprises multiple nodes, and the multiple nodes employ resources overlapping with the first resource group for transmitting a feedback signal.

In one embodiment, the first signal comprises Q3 repetitions of a first sub-signal, Q3 being a positive integer greater than 1.

In one embodiment, the second node's processing device 1400 is a UE.

In one embodiment, the second node's processing device 1400 is a base station.

In one embodiment, the second node's processing device 1400 is a relay node.

In one embodiment, the second node's processing device 1400 is a UE supporting V2X communications.

In one embodiment, the second node's processing device 1400 is a base station supporting V2X communications.

In one embodiment, the second node's processing device 1400 is a relay node supporting V2X communications.

In one embodiment, the second node's processing device 1400 is an IAB-supporting base station.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The base station or network-side equipment includes but is not limited to macro-cellular base stations, micro-cellular base stations, home base stations, relay base station, eNB, gNB, Transmitter Receiver Point (TRP), GNSS, relay satellite, satellite base station, airborne base station and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, which receives a first signaling;
a second receiver, which performs a first channel sensing operation over a first subband; and
a first transmitter, which transmits a first signal;
wherein the first signaling comprises first indication information, the first indication information indicating an Rx parameter of the first channel sensing operation; the first channel sensing operation is used for determining channel occupancy information, and the channel occupancy information is used for determining whether the first subband can be used by a transmitter of the first signaling for signal transmission; the first signal indicates the channel occupancy information; the first signaling is used for determining Q1 candidate resource groups, Q1 being a positive integer greater than 1; a first resource group is one of the Q1 candidate resource groups, and the first signal occupies the first resource group, the first resource group being related to the first indication information; the first indication information indicates multiple Rx parameters of the first channel sensing operation, and multiple candidate resource groups are respectively associated with the multiple Rx parameters of the first channel sensing operation; the first resource group is associated with one of the multiple Rx parameters of the first channel sensing operation, one of the multiple Rx parameters of the first channel sensing operation comprises a TCI (Transmission Configuration Indictor) state.

2. The first node according to claim 1, wherein transmission of the first signal indicates the channel occupancy information, the channel occupancy information comprising whether the first subband is idle;
or the channel occupancy information is a piece of UCI (Uplink Control Information), and the first signal comprises a physical uplink control channel (PUCCH).

3. The first node according to claim 1, wherein the first signaling comprises a first index, the first index being used for indicating a first device group, and the first node belongs to the first device group; the first device group comprises multiple nodes, and the multiple nodes employ resources overlapping with the first resource group for transmitting a feedback signal.

4. The first node according to claim 1, wherein the first receiver receives a second signaling, the second signaling comprising Q2 piece(s) of transmission configuration information, Q2 being a positive integer, and any one of the Q2 piece(s) of transmission configuration information is used for indicating an Rx parameter of the first channel sensing operation, and the first resource group is related to the second signaling.

5. The first node according to claim 4, wherein the first receiver performs the first channel sensing operation based on a target Rx parameter, the target Rx parameter belonging to a target Rx parameter set, and the target Rx parameter set comprising an overlap between the Rx parameters indicated by the first signaling and the Rx parameters indicated by the second signaling.

6. The first node according to claim 1, wherein the first signal comprises Q3 repetitions of a first sub-signal, Q3 being a positive integer greater than 1.

7. A second node for wireless communications, comprising:
a third receiver, which performs a second channel sensing operation over a first subband;
a second transmitter, which transmits a first signaling; and
a fourth receiver, which receives a first signal;
wherein the first signaling comprises first indication information, the first indication information indicating an Rx parameter of a first channel sensing operation; the first channel sensing operation is used for determining channel occupancy information, and the channel occupancy information is used for determining whether the first subband can be used by the second node for signal transmission; the first signal indicates the channel occupancy information; the first signaling is used for determining Q1 candidate resource groups, Q1 being a positive integer greater than 1; a first resource group is one of the Q1 candidate resource groups, and the first signal occupies the first resource group, the first resource group being related to the first indication information; the first indication information indicates multiple Rx parameters of the first channel sensing operation, and multiple candidate resource groups are respectively associated with the multiple Rx parameters of the first channel sensing operation; the first resource group is associated with one of the multiple Rx parameters of the first channel sensing operation, one of the multiple Rx parameters of the first channel sensing operation comprises a TCI (Transmission Configuration Indictor) state.

8. The second node according to claim 7, wherein transmission of the first signal indicates the channel occupancy information, the channel occupancy information comprising whether the first subband is idle;
or the channel occupancy information is a piece of UCI (Uplink Control Information), and the first signal comprises a physical uplink control channel (PUCCH).

9. The second node according to claim 7, wherein the first signaling comprises a first index, the first index being used for indicating a first device group, and the first node belongs to the first device group; the first device group comprises multiple nodes, and the multiple nodes employ resources overlapping with the first resource group for transmitting a feedback signal.

10. The second node according to claim 7, wherein the second transmitter transmits a second signaling, the second signaling comprising Q2 piece(s) of transmission configuration information, Q2 being a positive integer, and any one of the Q2 piece(s) of transmission configuration information is used for indicating an Rx parameter of the first channel sensing operation, and the first resource group is related to the second signaling.

11. The second node according to claim 7, wherein the first signal comprises Q3 repetitions of a first sub-signal, Q3 being a positive integer greater than 1.

12. A method in a first node for wireless communications, comprising:
receiving a first signaling;
performing a first channel sensing operation over a first subband; and
transmitting a first signal;
wherein the first signaling comprises first indication information, the first indication information indicating Rx parameters of the first channel sensing operation; the first channel sensing operation is used for determining channel occupancy information, and the channel occupancy information is used for determining whether the first subband can be used by a transmitter of the first signaling for signal transmission; the first signal indicates the channel occupancy information; the first signaling is used for determining Q1 candidate resource groups, Q1 being a positive integer greater than 1; a first resource group is one of the Q1 candidate resource groups, and the first signal occupies the first resource group, the first resource group being related to the first indication information; the first indication information indicates multiple Rx parameters of the first channel sensing operation, and multiple candidate resource groups are respectively associated with the multiple Rx parameters of the first channel sensing operation; the first resource group is associated with one of the multiple Rx parameters of the first channel sensing operation, one of the multiple Rx parameters of the first channel sensing operation comprises a TCI (Transmission Configuration Indictor) state.

13. The method in the first node according to claim 12, wherein transmission of the first signal is used for indicating the channel occupancy information, the channel occupancy information comprising whether the first subband is idle; or the channel occupancy information is a piece of UCI (Uplink Control Information), and the first signal comprises a physical uplink control channel (PUCCH).

14. The method in the first node according to claim 12, wherein the first signaling comprises a first index, the first index being used for indicating a first device group, and the first node belongs to the first device group; the first device group comprises multiple nodes, and the multiple nodes employ resources overlapping with the first resource group for transmitting a feedback signal.

15. The method in the first node according to claim 12, further comprising: receiving a second signaling; the second signaling comprises Q2 piece(s) of transmission configuration information, Q2 being a positive integer, and any one of the Q2 piece(s) of transmission configuration information is used for indicating an Rx parameter of the first channel sensing operation, and the first resource group is related to the second signaling.

16. The method in the first node according to claim 15, wherein the first channel sensing operation is performed based on a target Rx parameter, the target Rx parameter belonging to a target Rx parameter set, and the target Rx parameter set comprising an overlap between the Rx parameters indicated by the first signaling and the Rx parameters indicated by the second signaling.

17. The method in the first node according to claim 12, wherein the first signal comprises Q3 repetitions of a first sub-signal, Q3 being a positive integer greater than 1.

* * * * *